(12) United States Patent
Sidhan

(10) Patent No.: US 12,393,500 B2
(45) Date of Patent: Aug. 19, 2025

(54) INTELLIGENT EMBEDDED FUZZING

(71) Applicant: Schneider Electric USA, Inc., Andover, MA (US)

(72) Inventor: Britto Sidhan, Bangalore (IN)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/401,302

(22) Filed: Dec. 29, 2023

(65) Prior Publication Data

US 2025/0217249 A1 Jul. 3, 2025

(51) Int. Cl.
*G06F 11/00* (2006.01)
*G06F 11/26* (2006.01)
*G06F 11/263* (2006.01)

(52) U.S. Cl.
CPC .......... *G06F 11/263* (2013.01); *G06F 11/261* (2013.01)

(58) Field of Classification Search
CPC .............................. G06F 11/263; G06F 11/261
See application file for complete search history.

(56) References Cited

U.S. PATENT DOCUMENTS

| | | | |
|---|---|---|---|
| 7,594,142 B1 | 9/2009 | O'Leary | |
| 8,417,998 B2* | 4/2013 | Thomas | G06F 11/3636 |
| | | | 717/124 |
| 8,745,592 B1* | 6/2014 | Ormandy | G06F 11/3676 |
| | | | 717/124 |
| 2013/0212435 A1* | 8/2013 | Qiu | G06F 11/263 |
| | | | 714/E11.178 |
| 2023/0205677 A1* | 6/2023 | Eisele | G06F 11/3688 |
| | | | 717/124 |

OTHER PUBLICATIONS

Extended European Search Report for EP App. 24219523.8 dated Jun. 2, 2025, 11 pages.

* cited by examiner

*Primary Examiner* — Jason B Bryan
(74) *Attorney, Agent, or Firm* — Troutman Pepper Locke LLP

(57) ABSTRACT

Systems/methods for fuzzy testing provide internal monitoring or a device under test (DUT) as/while test inputs are being processed by software running on the DUT. The systems/methods use a fuzz monitor agent that resides within the DUT to monitor for occurrence of crashes, failures, faults, exceptions, and other unexpected or undesired events or behavior caused by the software attempting to process the test inputs. The fuzz monitor agent logs the occurrence of any such events or behavior, then reports or otherwise provides the monitor log and any associated data to the fuzzing engine. To improve efficiency, the fuzz monitor agent can be compiled and run within the target DUT itself in some embodiments. This is particularly effective for testing embedded devices or other special function devices that are included within another device or as part of a larger overall system.

20 Claims, 6 Drawing Sheets

INTELLIGENT EMBEDDED FUZZING

FIELD

The present disclosure relates generally to systems and methods for fuzzy testing of software, and more particularly to systems and methods for monitoring such fuzzy testing and feeding back any faults, errors, and exceptions for purposes of adapting or mutating the fuzzy testing based on the faults, errors, and exceptions.

BACKGROUND

Fuzzy testing, or fuzzing, refers to a technique used in software development to validate the software being developed. In fuzzy testing, a specialized testing unit called a fuzzing engine automatically generates and provides valid but unexpected or random data as inputs to the device running the software. The testing unit then monitors the device for crashes, time-outs, invalid memory access, buffer overflow, and other improper responses. An effective fuzzing engine generates inputs that are sufficiently valid not to be rejected outright by the software, yet unexpected enough to trigger unexpected or undesired behavior by certain parts of the software that may have not been developed properly.

However, while a number of advances have been made in the area of fuzzy testing, improvements continue to be needed. For example, existing fuzzy testing solutions treat the device under test (DUT) as a one-way black box. These solutions automatically generate and provide test inputs to the DUT, then simply look for the device to crash, time out, or exhibit some other improper or unexpected behavior. There is no ability to internally monitor the device under test as/while the test inputs are being processed by the software. As a result, these solutions cannot adapt or mutate the test inputs based on the internal response of the device under test and/or the software being validated, for purposes of subsequent testing.

SUMMARY

Embodiments of the present disclosure relate to systems and methods for fuzzy testing that can internally monitor a DUT as/while the test inputs are being processed by software running on the DUT. The systems and methods provide a fuzz monitor agent that resides within a target DUT to monitor for occurrence of any crashes, failures, faults, exceptions, and other unexpected or undesired events or behavior caused by the software attempting to process the test inputs. The fuzz monitor agent logs the occurrence of any such events, then reports or otherwise provides the monitor log and any associated data to the fuzzing engine. To improve efficiency, the fuzz monitor agent can be compiled and run within the target DUT itself in some embodiments. This is particularly effective for testing embedded devices or other special function devices that are included within another device or as part of a larger overall system. Such a fuzz monitor agent greatly improves the ability to detect certain vulnerabilities related to buffer overflow conditions, which if exploited, could allow remote code execution (RCE) or other privilege escalation attacks.

In some embodiments, the systems and methods herein are implemented on testing hardware running a real-time operating system (RTOS) that can capture occurrence of unexpected or undesired events in real time. In some embodiments, the testing may be conducted over a local network in which occurrences of unexpected or undesired events are recorded locally. It is also possible to use a cloud based approach where the fuzz monitor agent is deployed locally, but the monitor log and other data are pushed to fuzzing software residing on a cloud-computing environment for processing.

In general, in one aspect, embodiments of the present disclosure relate to a system for fuzzy testing of a device under test. The system comprises, among other things, a fuzzing target configured to run an operating system thereon, the operating system operable to execute software on the fuzzing target. The system additionally comprises a fuzzing engine connected to the fuzzing target and configured to generate test inputs for the fuzzing target, the test inputs used by the fuzzing target to validate the software, the fuzzing engine operable to mutate the test inputs generated for the fuzzing target. The system further at least one watchdog in the fuzzing target, the at least one watchdog configured to detect unexpected or undesired events or behavior at the fuzzing target, and a fuzz monitor agent in the fuzzing target, the fuzz monitor agent configured to monitor the at least one watchdog and log diagnostic information related to any unexpected or undesired event or behavior detected by the at least one watchdog, the fuzz monitor agent further configured to provide the logged diagnostic information to the fuzzing engine. The fuzzing engine is further configured to mutate subsequent test inputs generated for the fuzzing target based on the diagnostic information provided by the fuzz monitor agent.

In general, in another aspect, embodiments of the present disclosure relate to a method for fuzzy testing of a device under test. The method comprises, among other things, providing a fuzzing target, running an operating system on the fuzzing target, and executing software on the fuzzing target via the operating system. The method additionally comprises generating test inputs at a fuzzing engine for the fuzzing target, the fuzzing engine connected to the fuzzing target and operable to mutate the test inputs generated for the fuzzing target, and using the test inputs at the fuzzing target to validate the software. The method further comprises running at least one watchdog in the fuzzing target, the at least one watchdog configured to detect unexpected or undesired events or behavior at the fuzzing target, and running a fuzz monitor agent in the fuzzing target, the fuzz monitor agent configured to monitor the at least one watchdog and log diagnostic information related to any unexpected or undesired event or behavior detected by the at least one watchdog. The diagnostic information logged by the fuzz monitor agent is provided to the fuzzing engine, and the fuzzing engine is further configured to mutate subsequent test inputs generated for the fuzzing target based on the diagnostic information provided by the fuzz monitor agent.

In general, in yet another aspect, embodiments of the present disclosure relate to a computer-readable medium comprising computer-readable instructions for causing a processor to conduct fuzzy testing of a device under test. The computer-readable instructions cause the processor to, among other things, monitor at least one watchdog in a fuzzing target and log diagnostic information related to any unexpected or undesired event or behavior detected by the at least one watchdog, the fuzzing target configured to run an operating system thereon, the operating system operable to execute software on the fuzzing target. The computer-readable instructions additionally cause the processor to provide the logged diagnostic information to a fuzzing engine, the fuzzing engine connected to the fuzzing target and configured to generate test inputs for the fuzzing target, the test inputs used by the fuzzing target to validate the software, the fuzzing engine operable to mutate the test inputs generated for the fuzzing target. The fuzzing engine is further configured to mutate subsequent test inputs generated for the fuzzing target based on the diagnostic information provided by the fuzz monitor agent.

In accordance with any one or more of the foregoing embodiments, the mutated subsequent test inputs are subsequently used by the fuzzing target to validate the software, and/or the at least one watchdog includes one or more of a software watchdog timer or a hardware watchdog timer.

In accordance with any one or more of the foregoing embodiments, the diagnostic information logged by the fuzz monitor agent includes one or more of: an application/service restart, availability of resources, changes to sensor files, CPU usage, memory usage, or hardware failures.

In accordance with any one or more of the foregoing embodiments, a timeout period of the software watchdog timer is less than a timeout period of the hardware watchdog timer, the operating system is a real-time operating system that allows the fuzz monitor agent to log the diagnostic information in real time, and/or the fuzzing target is an embedded device that is contained within another device or a larger overall system.

BRIEF DESCRIPTION OF THE DRAWINGS

The foregoing features of the disclosure, as well as the disclosure itself may be more fully understood from the following detailed description of the drawings, in which.

DETAILED DESCRIPTION

Figure 1:
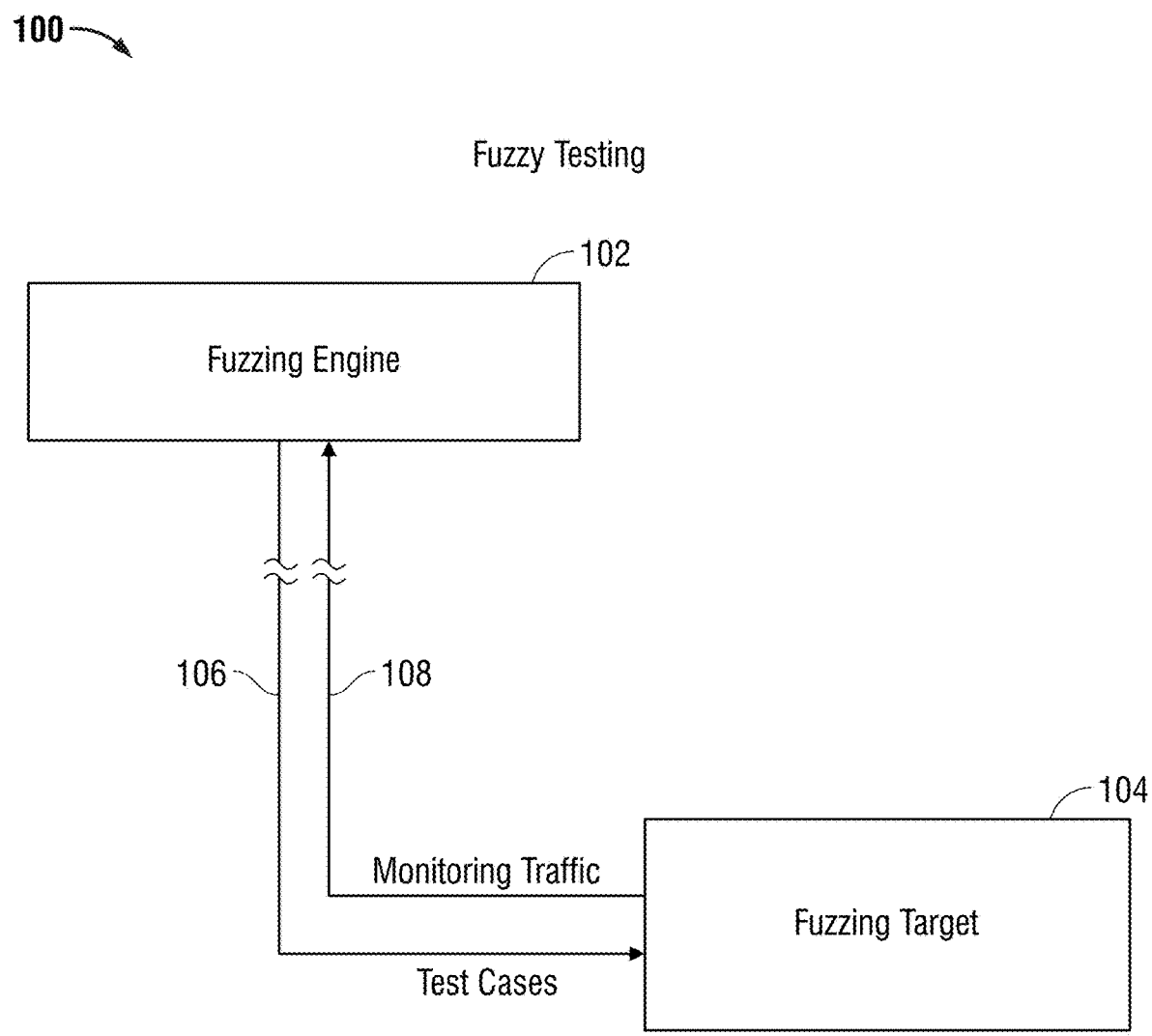
FIG. 1 shows an exemplary system for intelligent embedded fuzzing in accordance with embodiments of the disclosure.

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain concepts and terms referenced in the present disclosure are collected here. As used herein:

A "0-day vulnerability" refers to a computer software vulnerability either unknown to those who should be interested in its mitigation, or known to them, but they do not have a patch to correct it. The "0-day" refers to the fact that the vendor or developer has only just learned of the flaw, which means they have "zero days" to fix it. Similarly, an exploit directed at a zero-day is called a "0-day exploit."

A "central processing unit" or "CPU" refers to electronic circuitry that executes computer program instructions.

A "device under test" or "DUT" refers to a device that is being tested and may be a component of a bigger module or unit known as a "unit under test" or "UUT."

A "programmable logic controller" or "PLC" refers to an industrial computer that has been ruggedized and adapted for the control of manufacturing processes, such as assembly lines, machines, robotic devices, or any activity that requires high reliability, ease of programming, and process fault diagnosis. Wherever there is a need to control industrial devices, PLCs provide a flexible way to "softwire" the required components together.

"Remote code execution" or "RCE" refers to a type of computer vulnerability that allows a malicious actor to remotely execute code on a machine over a LAN, WAN, or the Internet.

A "real-time operating system" or "RTOS" refers to an operating system (OS) for real-time applications that processes data and events that have critically defined time constraints. In an RTOS, processing time requirement are often calculated in tenths of seconds time increments. Real-time operating systems are event-driven and pre-emptive, meaning the OS can monitor the relevant priority of competing tasks and make changes to the task priority.

A "watchdog" or "watchdog timer" or "WDT" refers to a timer, implemented as hardware or software, that detects and helps a device recover from software errors. The watchdog timer monitors the execution of code and resets the device's processor if the software running on the processor crashes. Watchdog timers are widely used in computers to facilitate automatic correction of temporary hardware faults and to prevent errant or malevolent software from disrupting system operation. The watchdog timer typically operates independently of the processor.

As discussed above, fuzzy testing currently uses a black box approach that does not provide visibility into the internal operation of the DUT or any ability to monitor what is happening within the DUT. These fuzzy testing solutions are mostly used to test a DUT by directly connecting the DUT to a fuzzing engine, but without providing any feedback from the DUT to the fuzzing engine. As a result, current fuzzy testing solutions have no ability to adapt or mutate the test inputs based on the response of the DUT and/or the software. Embodiments of the present disclosure provide systems and methods for fuzzy testing that can adapt and mutate test inputs based on feedback from a DUT and/or software being validated on the DUT.

Referring to now FIG. 1, a fuzzy testing system 100 (and method therefor) is shown according to embodiments of the present disclosure that can adapt and mutate test inputs by using a fuzz monitor agent residing within a DUT to provide feedback from the DUT. The system 100 generally has two main components that are shown here as functional blocks, including a fuzzing engine 102 and a fuzzing target 104 (i.e., device under test). The fuzzing target 104 may be any device capable of running software thereon such that the software needs to be validated before it is released on the device. In some embodiments, the device may be an embedded device or other special function device that is included within another device or as part of a larger overall system. Examples of suitable devices that may be used as the fuzzing target 104 include programmable logic controllers (PLCs), remote terminal units (RTUs), programmable automation controllers (PLCs), and the like.

In general, the fuzzing engine 102 operates by automatically generating valid but unexpected or random data as test inputs and providing them as test cases 106 to the fuzzing target 104. On the fuzzing target 104, a fuzz monitor agent, as discussed further herein, monitors the operation of the fuzzing target 104 as/while certain software that is being validated on the fuzzing target 104 processes the inputs of each test case 106. The fuzz monitor agent captures and logs any crashes and failure scenarios along with the reasons therefor, as provided by the fuzzing target 104 and/or the software being validated. The fuzz monitor agent then reports or otherwise provides the monitor logs and associated data as monitor traffic 108 to the fuzzing engine 102. The fuzzing engine 102 can then use this feedback to modify the test inputs and provide further test cases 106 with which to validate the software on the fuzzing target 104. The testing and feedback may be conducted over a local network in some embodiments in which occurrences of crashes and failure scenarios are recorded locally (i.e., on-site), or it may be conducted over a remote network that uses cloud-based computing resources to host and execute one or more components of the fuzzing engine 102 and/or the fuzzing target 104.

The above fuzzy testing system 100 has proven to identify bugs and problems in the software more effectively and thoroughly compared to the traditional black box fuzzing approaches. In addition, the system 100 also significantly reduces the time required for post-crash analysis compared to the traditional black box fuzzing approach, as the details for the failures and crashes, including software and hardware faults, are fed back to the fuzz engine 102 where they are readily available for analysis. The foregoing approach helps software developers more quickly assess how test cases affect a target device both in terms of internal hardware components and software services.

Figure 2:
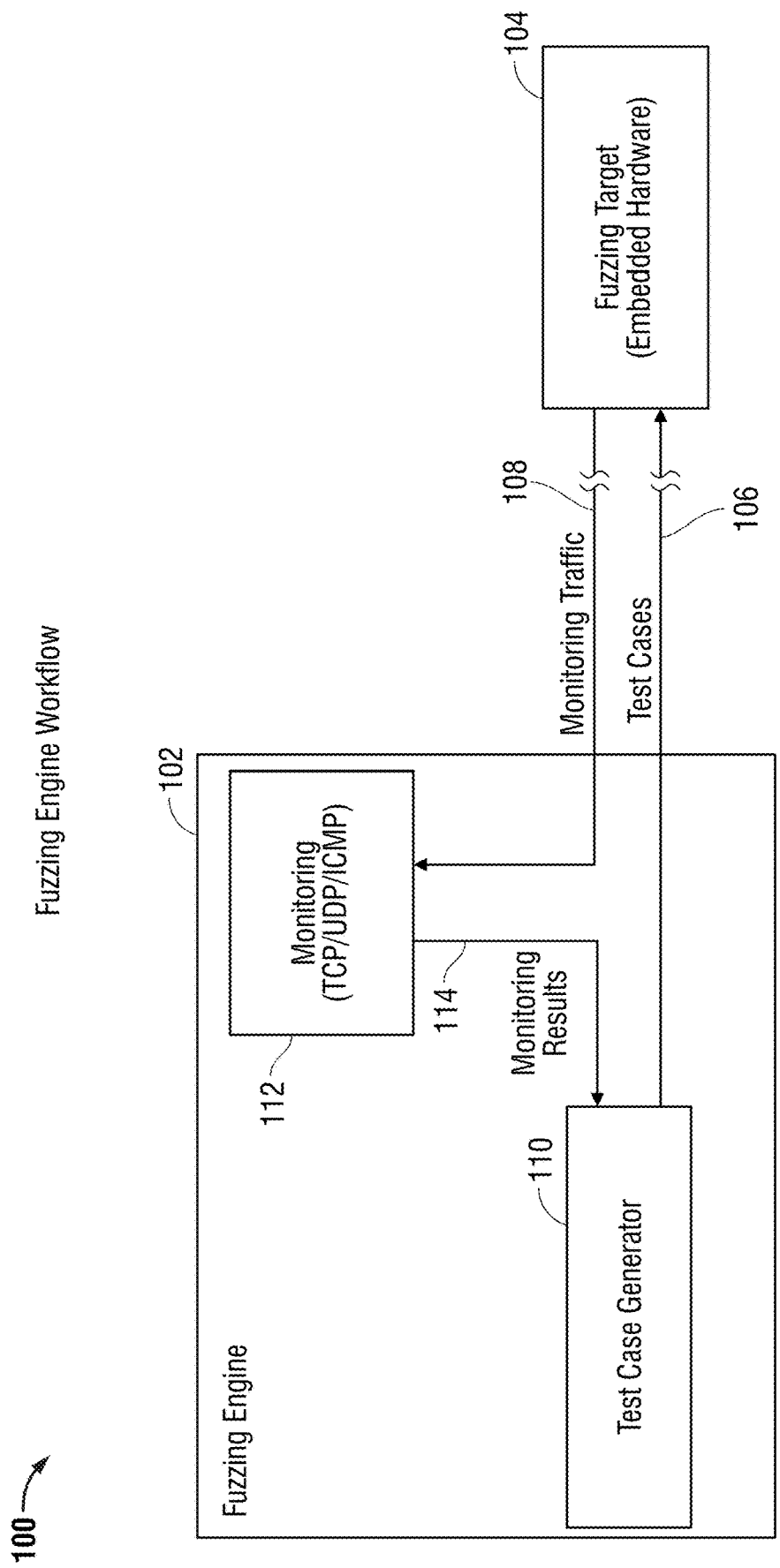
FIG. 2 shows exemplary an exemplary fuzzing engine workflow in accordance with embodiments of the disclosure.

FIG. 2 shows the fuzzy testing system 100 (and method therefor) in more detail according to embodiments of the present disclosure. As can be seen, the fuzzing engine 102 in this example includes a test case generator 110 and a monitoring function 112, among other components. The test case generator 110 operates to generate the valid but unexpected or random test inputs in a manner known to those skilled in the art. The test case generator 110 then provides these inputs as test cases 106 to the fuzzing target 104, which may be an embedded device in this example. Meanwhile, the monitoring function 112 operates to receive and process the monitoring traffic 108 from the fuzzing target 104 over one or more ports in the fuzzing target 104 (via the fuzz monitor agent therein). The one or more ports may include TCP (Transmission Control Protocol) ports and UDP (User Datagram Protocol) ports, or the fuzzing target 104 may look for ICMP (Internet Control Message Protocol) packets on one of the ports, and the like.

The monitoring function 112 thereafter processes the monitoring traffic 108, for example, by cleaning, filtering, and formatting the monitor logs and associated data, and determining whether they indicate occurrence of an unexpected or undesired event or behavior at the fuzzing target 104. If any unexpected or undesired event or behavior is found from the monitoring traffic 108, the monitoring function 112 provides the unexpected or undesired event or behavior as monitoring results 114 to the test case generator 110. The test case generator 110 then uses the monitoring results 114 to adapt, mutate, and otherwise modify the previous test inputs to generate new test inputs for the fuzzing target 104. Techniques for modifying test inputs for a particular device being tested are known to those skilled in the art and thus a detailed description is omitted here for economy.

Figure 3:
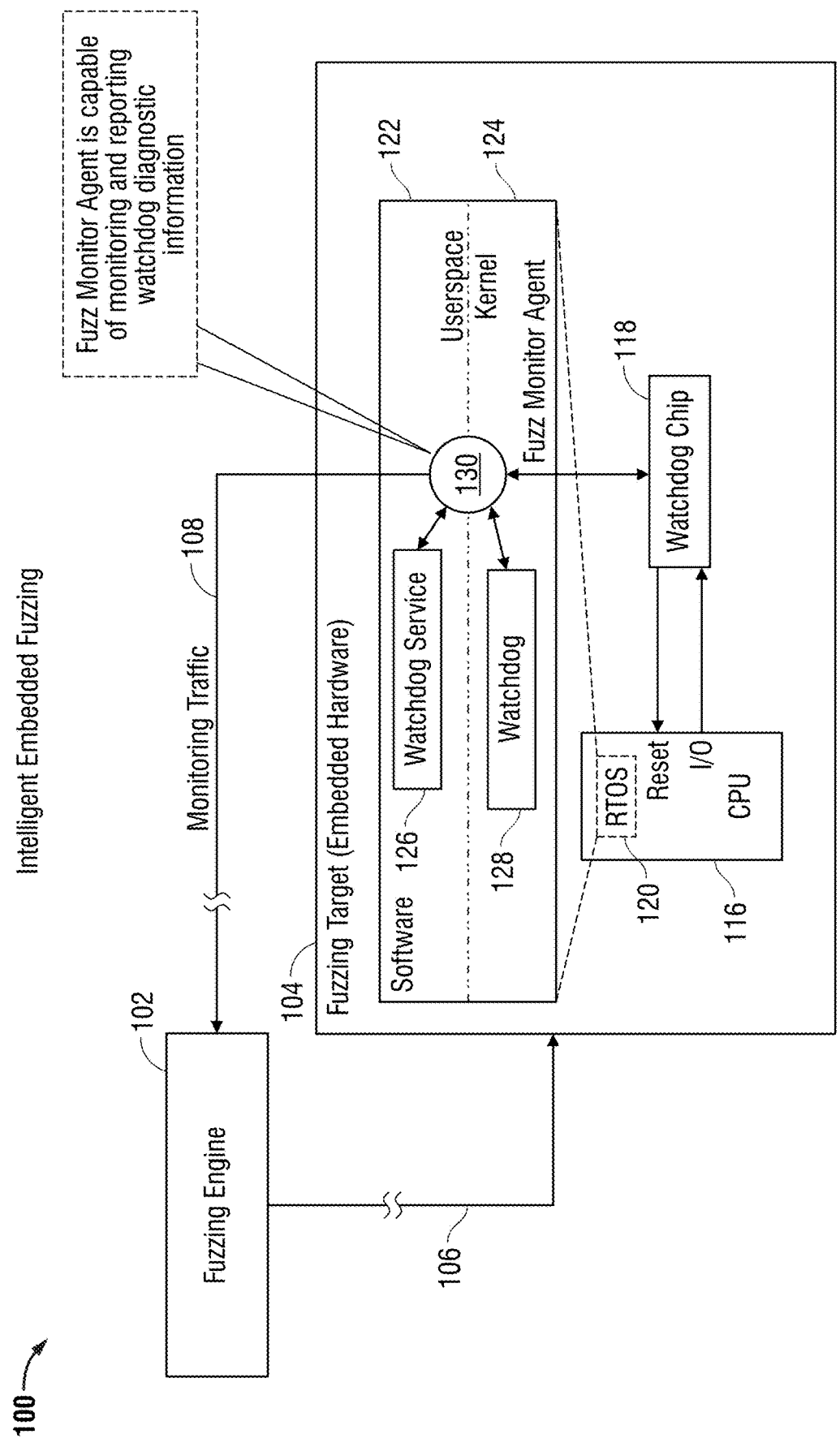
FIG. 3 shows an exemplary implementation of intelligent embedded fuzzing in accordance with embodiments of the disclosure.

FIG. 3 shows the fuzzy testing system 100 (and method therefor) in additional detail according to embodiments of the present disclosure. As this figure illustrates, the fuzzing target 104 includes the CPU 116 and a watchdog timer chip 118, among other components. The CPU 116 may be any suitable processor unit that can process and execute program instructions on the particular fuzzing target 104 being tested, such as a microprocessor, microcontroller, ASIC (application-specific integrated circuit), FPGA (field programmable gate array), and the like. Similarly, the watchdog timer chip 118 may be any suitable watchdog timer that can be used to monitor and reset the CPU 116 upon detection of a crash, fault, failure, exception, or other event. To this end, the watchdog timer may be connected or otherwise communicatively coupled to an appropriate input/output (I/O) pin and a reset pin of the CPU 116 in a known manner.

A real-time operating system (RTOS) 120 runs on the CPU 116 and is responsible for overall operation of the CPU 116. The RTOS 120 in this example has a user space 122 that operates to allow a user to interact with the fuzzing target 104, as well as a kernel 124 that serves as an interface between any software being validated on the fuzzing target 104 and the CPU 116. A user space watchdog service 126 in the RTOS 120 monitors the user space side operation of the software being validated for any crashes, faults, failures, exceptions and other events. Similarly, a kernel side watchdog 128 in the RTOS 120 monitors the kernel side operation of the software being validated for any crashes, faults, failures, exceptions, and other events.

In accordance with embodiments of the present disclosure, a fuzz monitor agent 130 may be provided within the fuzzing target 104 to monitor the internal operation of the target 104 during the validation of the software. The fuzz monitor agent 130 may be run by or within the RTOS 120 in a manner to receive information from the user space watchdog service 126 as well as the kernel side watchdog 128. In this way, the monitor agent 130 can monitor for occurrence of any crashes, failures, faults, exceptions, and other unexpected or undesired events or behavior detected by the user space watchdog service 126 as well as the kernel side watchdog 128. Similarly, the fuzz monitor agent 130 may also be communicatively coupled to the watchdog timer chip 118 in a manner that allows the fuzz monitor agent 130 to monitor for occurrence of any crashes, failures, faults, exceptions, and other unexpected or undesired events or behavior detected by the watchdog timer chip 118. Upon detection of any unexpected or undesired events or behavior by any of the watchdog services 118, 126, 128, the fuzz monitor agent 130 receives and logs the unexpected or undesired events or behavior and reports or otherwise provides the monitor log and associated data as monitoring traffic 108 to the fuzzing engine 102.

In some embodiments, the fuzzing target 104 may be implemented via a custom debugger for embedded devices, which can include hardware and software watchdog timers. Software developed for the embedded devices may then be run on such a fuzzing target 104 to validate the software. Note that the timeout periods for any software watchdogs should be set to less than the hardware-based watchdog timeouts. Also, the use mechanism should be a watchdog implementation so that global variables will retain their state after a watchdog timer reset. In addition, the hardware-based watchdog should be configured to monitor system critical functions, as in some cases, certain functionality of the device could be impacted, such as power monitoring. With a suitable hardware debugger and associated software, code coverage and real-time profiling of the software may be provided.

Figure 4:
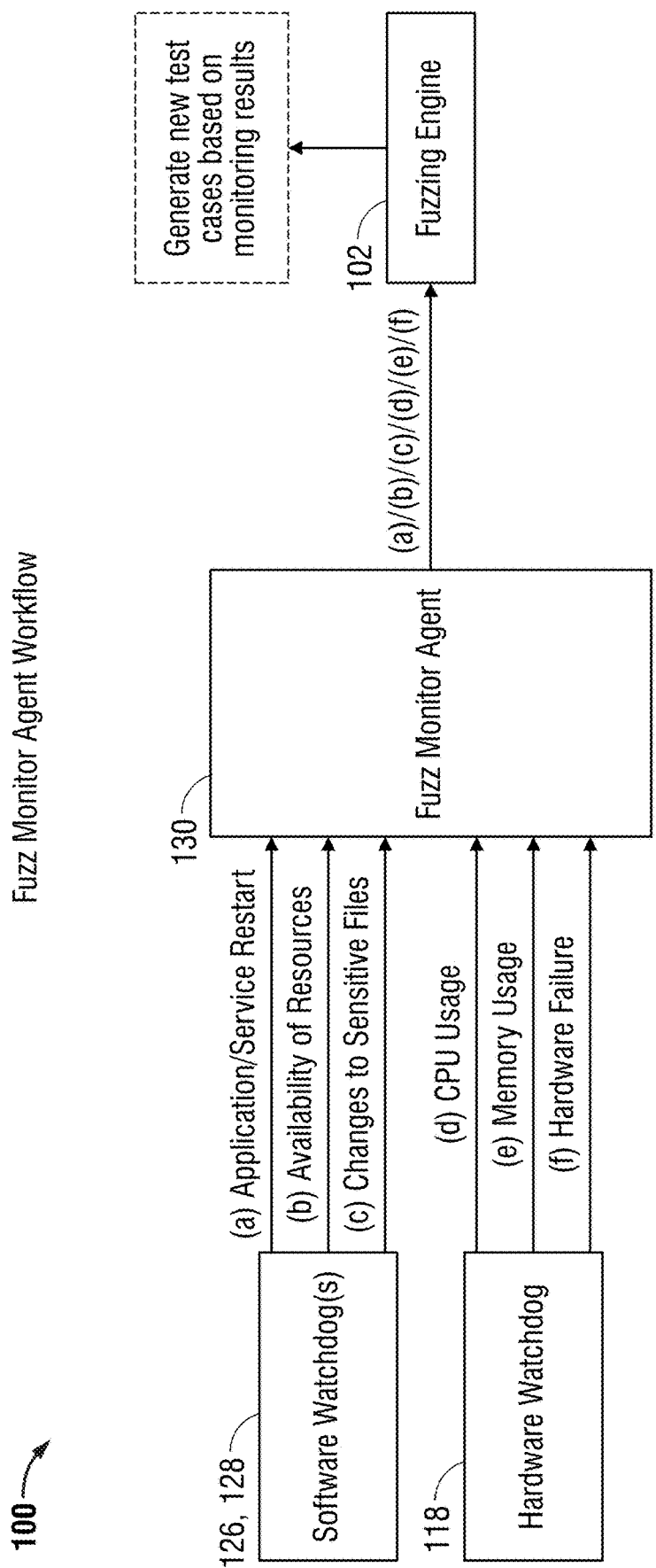
FIG. 4 shows an exemplary fuzz monitor agent workflow in accordance with embodiments of the disclosure.

FIG. 4 shows an exemplary implementation of the fuzz monitor agent 130 (and method therefor) according to embodiments of the present disclosure. As can be seen, the fuzz monitor agent 130 is designed or otherwise configured to be communicatively coupled to the hardware-based watchdog timer chip 118 as well one or both of the software watchdog timers 126, 128. This communicative coupling allows the fuzz monitor agent 130 to receive from one or both of the software watchdog timers 126, 128 various diagnostic information upon occurrence of a crash, fault, failure, exceptions and other unexpected or undesired events or behavior. Examples of such diagnostic information may include (a) application/service restart, (b) availability of resources, (c) changes to sensor files, and the like. In a similar manner, the fuzz monitor agent 130 can also receive from the hardware-based watchdog timer 118 various diagnostic information upon occurrence of a crash, fault, failure, exceptions and other unexpected or undesired events or behavior. Examples of such diagnostic information may include (d) CPU usage, (e) memory usage, (f) hardware failures, and the like. Upon receiving such diagnostic information, the fuzz monitor agent 130 logs the information and then reports or otherwise provides the monitor log containing the diagnostic information and associated data to the fuzzing engine 102. The above arrangement can help eliminate false positives in the testing, as the reasons for a crash, failure, fault, and so on, are recorded by the fuzz monitor agent 130 and provided to the fuzzing engine 102.

The above arrangement can also greatly increase coverage for the fuzz target 104 in functional areas that would not normally be covered. In particular, the fuzz monitor agent 130 can be used to cover watchdog diagnostic information related to abnormal behaviors which are not normally sent or otherwise made visible to the fuzzing engine 102. The fuzz monitor agent 130 can then feed this information to the fuzzing engine 102 to produce more accurate test results. For example, when a watchdog timer restart occurs, a device under test may sometimes be down or go offline for an extended duration, which can last 20 to 30 seconds in some cases. The fuzz monitor agent 130 can accurately capture this power off/on cycle information by virtue of the watchdog service in the RTOS 120 and provide the information as feedback to the fuzzing engine 102.

In general, the fuzz monitor agent 130 disclosed herein can provide a number of benefits and advantages over traditional fuzzing. For example, the fuzz monitor agent 130 herein can be configured on target embedded hardware (i.e., fuzzing target) and can be used to monitor for fuzzing successes. The fuzz monitor agent 130 herein also improves coverage of fuzzing as it not only monitors for TCP/UDP/ICMP status of a fuzzing target, but also checks for hardware and software failures on the fuzzing target. The fuzz monitor agent 130 herein additionally improves efficiency of fuzzing as the agent can detect crashes or errors on a fuzzing target very accurately, thereby reducing false positives and false negatives, and uncovering vulnerabilities that would otherwise be missed by traditional fuzzing engines. The fuzz monitor agent 130 is also capable of detailed reporting, as it monitors hardware and software code to help developers pinpoint bugs and address them more quickly than traditional black-box type fuzzing. And in contrast to traditional fuzzing engines that do not actively obtain diagnostic data, the fuzz monitor agent 130 herein actively pushes diagnostic data and measured metrics from the fuzzing target 104 to the fuzzing engine 102. The fuzz monitor agent 130 is further capable of handling both software and hardware watchdog timer feedbacks simultaneously.

Thus far, several embodiments of the exemplary fuzzy testing system 100 have been shown and described. Following now in FIG. 5 is an exemplary method that may be used by or with embodiments of the exemplary fuzzy testing system 100.

Figure 5:
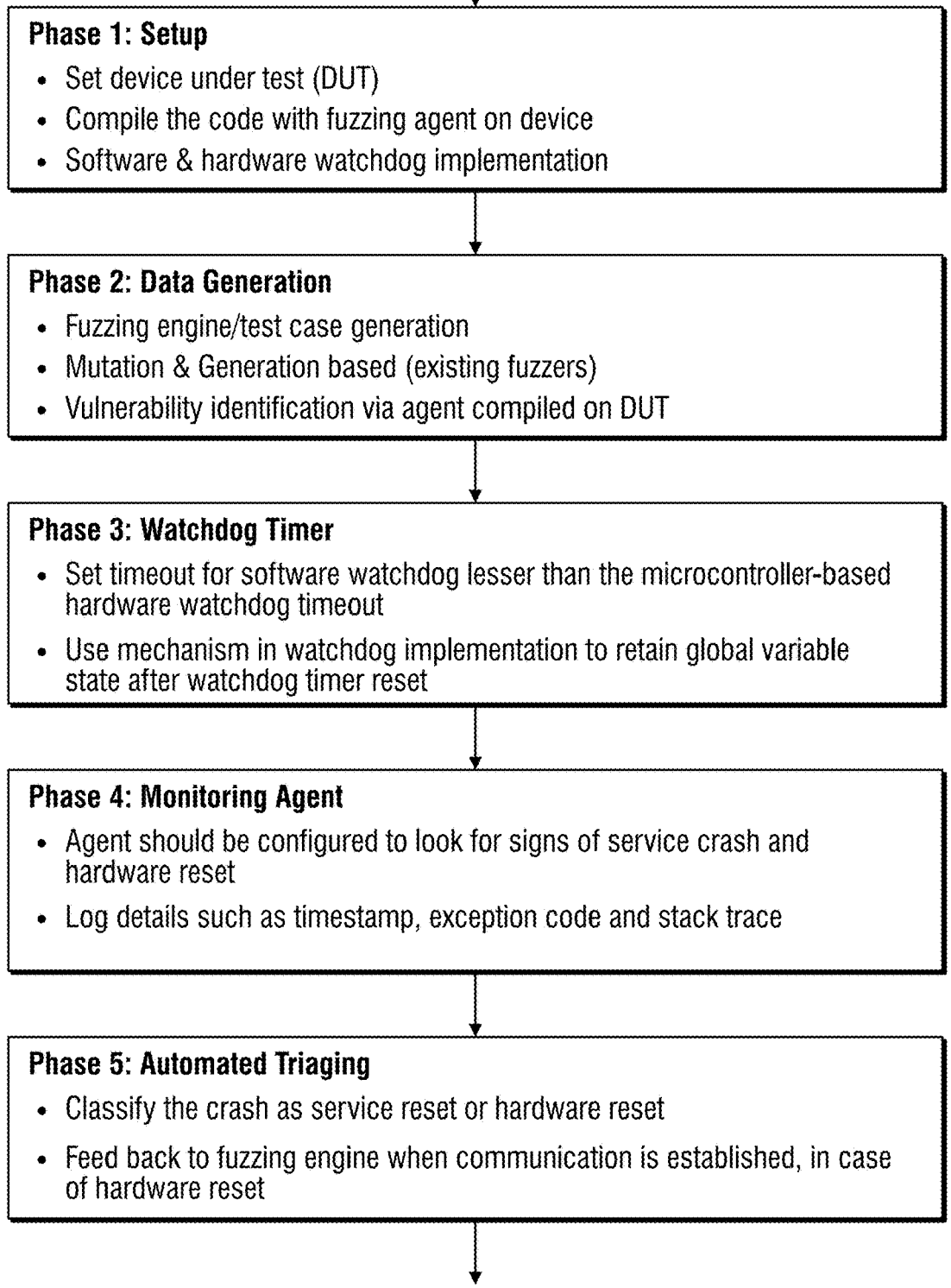
FIG. 5 shows an exemplary method for intelligent embedded fuzzing in accordance with embodiments of the disclosure.

Referring to FIG. 5, an exemplary flow diagram is shown depicting a number of phases that represent a method 500 of fuzzy testing according to embodiments of the present disclosure. The method 500 generally begins with Phase 1 where setup of a fuzzy testing system is performed. This phase primarily involves setting up a device under test, compiling program code containing the fuzz monitor agent on the DUT, and implementing the software and hardware watchdog timers on the DUT that will be used to detect unexpected or undesired events or behavior and provide diagnostic information to the fuzz monitor agent.

The next phase, Phase 2, is where data generation is performed. This phase involves, among other things, executing a fuzzing engine/test input generator that generates mutated test inputs and provides them to the fuzzing target in a manner similar to existing fuzzing engines. Any vulnerabilities revealed by the test inputs can then be identified via the fuzz monitor agent compiled on the DUT.

Phase 3 is where setup of the watchdog timers is performed. This phase involves, among other things, setting the timeout periods for the software watchdog timers, being sure to set the timeout periods for the software watchdog timers to less than the timeout periods for the microcontroller-based or hardware watchdog timers. The data registers in the watchdog timers should be configured to retain all global variable states after the watchdog timers reset.

Phase 4 is where setup of the fuzz monitor agent is performed. This phase involves, among other things, configuring the fuzz monitor agent to look for signs of service crashes and hardware resets and to log the details all such crashes and resets, including any timestamps, exception codes, stack traces, and the like.

The next phase, Phase 5, is where any automated triaging that may be needed is performed. This phase involves, among other things, the fuzz monitor agent automatically classifying any crash as a service reset or a hardware reset and feeding back the classification and associated data to the fuzzing engine. This feedback can occur after communication with the fuzzing engine is reestablished in case of a hardware reset.

Figure 6:
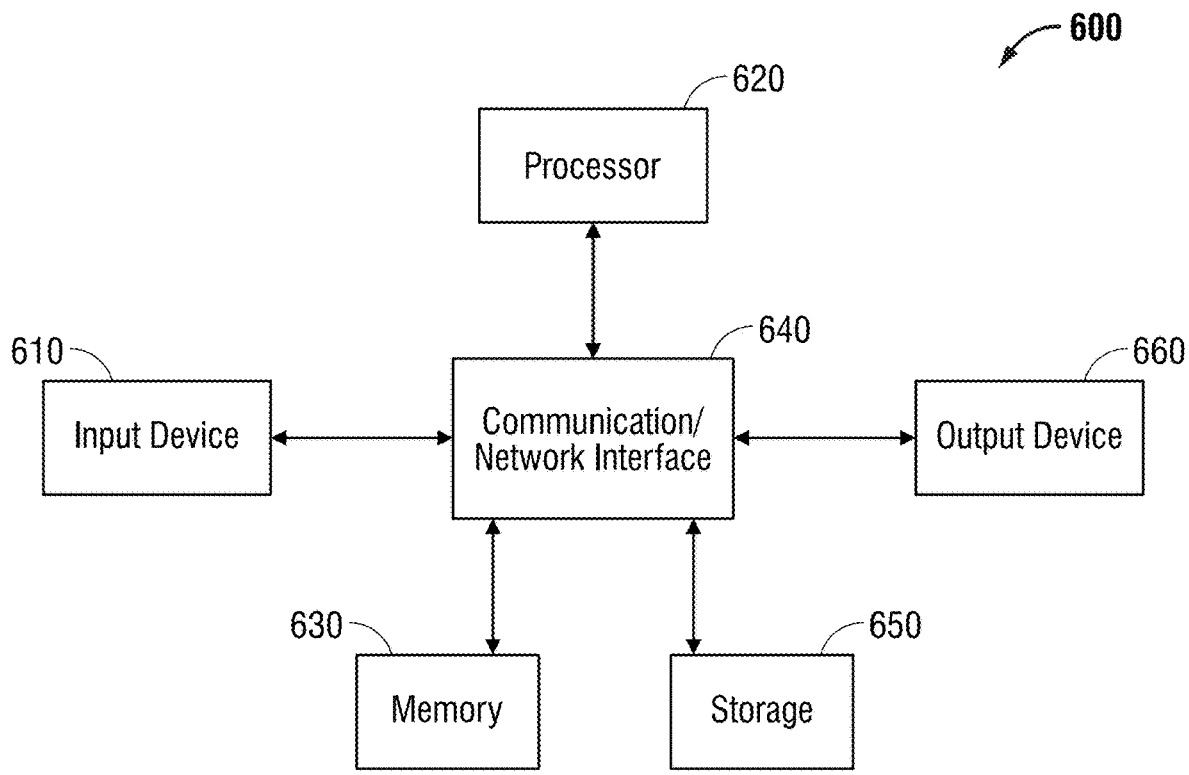
FIG. 6 shows a functional block diagram of an exemplary system that may be used to implement various embodiments of this disclosure.

FIG. 6 illustrates an exemplary system that may be used to implement various embodiments of this disclosure. For example, various embodiments of the disclosure may be implemented as specialized software executing in a system 600 such as that shown in FIG. 6. The system 600 may include a processor 620 connected to one or more memory devices 630, such as magnetic or solid state memory, either embedded and discrete, or other memory devices for storing data. Memory 630 is typically used for storing programs and data during operation of the system 600. The system 600 may also include a storage system 650 that provides additional storage capacity. Components of system 600 may be coupled by a communication interface 640, which may include one or more busses (e.g., between components that are integrated within the same machine) and/or a network interface 640 (e.g., between components that reside on separate discrete machines). The communication/network interface 640 enables communications (e.g., data, instructions, etc.) to be exchanged between system components of system 600 and system components of other systems on the network.

System 600 also includes one or more input devices 610, for example, keys, buttons, microphone, touch screen, and one or more output devices 660, for example, a display screen, LEDs, and the like. In addition, system 600 may contain one or more interfaces (not shown) that connect system 600 to a communication network (in addition or as an alternative to the interconnection mechanism 640).

Figure 7:
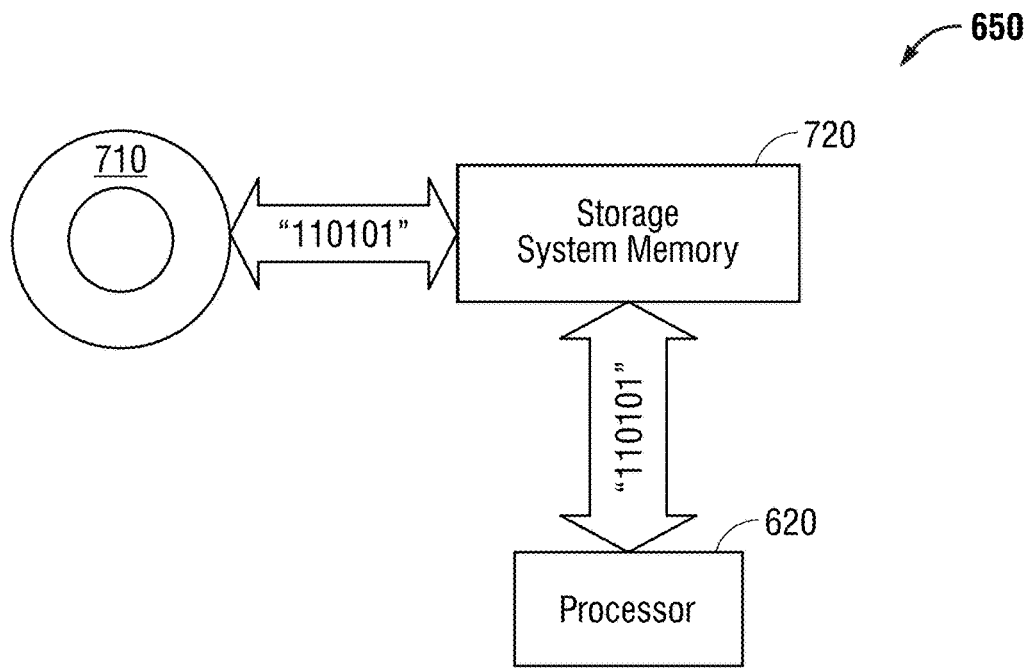
FIG. 7 shows a functional block diagram of a storage system that may be used to implement various embodiments of this disclosure.

The storage system 650, shown in greater detail in FIG. 7, typically includes a computer readable and writeable nonvolatile recording medium 710 in which signals are stored that define a program to be executed by the processor 620 or information stored on or in the medium 710 to be processed by the program to perform one or more functions associated with embodiments described herein. To this end, the processor 620 may be any suitable processing unit, such as a microprocessor, microcontroller, ASIC, and the like, and the medium any suitable recording medium, such as a magnetic or solid-state memory. Typically, in operation, the processor 620 causes data to be read from the nonvolatile recording medium 710 into storage system memory 720 that allows for faster access to the information by the processor than does the medium 710. This storage system memory 720 is typically a volatile, random access memory such as a dynamic random-access memory (DRAM) or static memory (SRAM). This storage system memory 720 may be located in storage system 650, as shown, or in the system memory 630. The processor 620 generally manipulates the data within the memory system 720 and then copies the data to the medium 710 after processing is completed. A variety of mechanisms are known for managing data movement between the medium 710 and the integrated circuit memory element 720, and the disclosure is not limited thereto. The disclosure is not limited to a particular memory 720, memory 630 or storage system 650.

The system 600 may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the system described above or as an independent component.

Although the system 600 is shown by way of example as one type of system upon which various aspects of the disclosure may be practiced, it should be appreciated that aspects of the disclosure are not limited to being implemented on the system as shown in FIG. 6. Various aspects of the disclosure may be practiced on one or more devices having a different architecture or components from that shown in FIG. 6. Further, where functions or processes of embodiments of the disclosure are described herein (or in the claims) as being performed on a processor or controller, such description is intended to include systems that use more than one processor or controller to perform the functions.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It will be appreciated that the development of an actual commercial application incorporating aspects of the disclosed embodiments will require many implementation-specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or system, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage system, a magnetic storage system, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store system data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C#(C-Sharp). Other object-oriented programming languages may also be used. Alternatively, functional, scripting, and/or logical programming languages may be used, such as BASIC, Fortran, Cobol, TCL, or Lua. Various aspects of the disclosure may be implemented in a non-programmed environment (e.g., analytics platforms, or documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus far, a number of features and advantages of embodiments of the present disclosure have been shown and described. Other possible features and advantages associated with the disclosed embodiments will be appreciated by one of ordinary skill in the art. It should also be understood that embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in the example applications described herein (e.g., industrial applications), but rather may be useful in substantially any application where it is desired to monitor, whether visually or remotely, the status/configuration of a system or equipment. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above. Accordingly, it is submitted that that scope of the patent should not be limited to the described embodiments but rather should be limited only by the spirit and scope of the following claims.

What is claimed is:

1. A system for fuzzy testing of a device under test, the system comprising:
    a fuzzing target configured to run an operating system thereon, the operating system operable to execute software on the fuzzing target;
    a fuzzing engine connected to the fuzzing target and configured to generate test inputs for the fuzzing target, the test inputs used by the fuzzing target to validate the software, the fuzzing engine operable to mutate the test inputs generated for the fuzzing target;

at least one watchdog in the fuzzing target, the at least one watchdog configured to detect unexpected or undesired events or behavior at the fuzzing target; and a fuzz monitor agent in the fuzzing target, the fuzz monitor agent configured to monitor the at least one watchdog and log diagnostic information related to any unexpected or undesired event or behavior detected by the at least one watchdog, the fuzz monitor agent further configured to provide the logged diagnostic information to the fuzzing engine;

wherein the fuzzing engine is further configured to mutate subsequent test inputs generated for the fuzzing target based on the diagnostic information provided by the fuzz monitor agent.

2. The system of claim 1, wherein the mutated subsequent test inputs are subsequently used by the fuzzing target to validate the software.

3. The system of claim 1, wherein the at least one watchdog includes one or more of a software watchdog timer or a hardware watchdog timer.

4. The system of claim 3, wherein the diagnostic information logged by the fuzz monitor agent includes one or more of: an application/service restart, availability of resources, changes to sensor files, CPU usage, memory usage, or hardware failures.

5. The system of claim 3, wherein a timeout period of the software watchdog timer is less than a timeout period of the hardware watchdog timer.

6. The system of claim 1, wherein the operating system is a real-time operating system that allows the fuzz monitor agent to log the diagnostic information in real time.

7. The system of claim 1, wherein the fuzzing target is an embedded device that is contained within another device or a larger overall system.

8. A method for fuzzy testing of a device under test, the method comprising:
providing a fuzzing target;
running an operating system on the fuzzing target;
executing software on the fuzzing target via the operating system;
generating test inputs at a fuzzing engine for the fuzzing target, the fuzzing engine connected to the fuzzing target and operable to mutate the test inputs generated for the fuzzing target;
using the test inputs at the fuzzing target to validate the software;
running at least one watchdog in the fuzzing target, the at least one watchdog configured to detect unexpected or undesired events or behavior at the fuzzing target;
running a fuzz monitor agent in the fuzzing target, the fuzz monitor agent configured to monitor the at least one watchdog and log diagnostic information related to any unexpected or undesired event or behavior detected by the at least one watchdog; and
providing the diagnostic information logged by the fuzz monitor agent to the fuzzing engine;
wherein the fuzzing engine is further configured to mutate subsequent test inputs generated for the fuzzing target based on the diagnostic information provided by the fuzz monitor agent.

9. The method of claim 8, wherein the mutated subsequent test inputs are subsequently used by the fuzzing target to validate the software.

10. The method of claim 8, wherein the at least one watchdog includes one or more of a software watchdog timer or a hardware watchdog timer.

11. The method of claim 10, wherein the diagnostic information logged by the fuzz monitor agent includes one or more of: an application/service restart, availability of resources, changes to sensor files, CPU usage, memory usage, or hardware failures.

12. The method of claim 10, wherein a timeout period of the software watchdog timer is less than a timeout period of the hardware watchdog timer.

13. The method of claim 8, wherein the operating system is a real-time operating system that allows the fuzz monitor agent to log the diagnostic information in real time.

14. The method of claim 8, wherein the fuzzing target is an embedded device that is contained within another device or a larger overall system.

15. A non-transitory computer-readable medium comprising computer-readable instructions for causing a processor to:
monitor at least one watchdog in a fuzzing target and log diagnostic information related to any unexpected or undesired event or behavior detected by the at least one watchdog, the fuzzing target configured to run an operating system thereon, the operating system operable to execute software on the fuzzing target;
and provide the logged diagnostic information to a fuzzing engine, the fuzzing engine connected to the fuzzing target and configured to generate test inputs for the fuzzing target, the test inputs used by the fuzzing target to validate the software, the fuzzing engine operable to mutate the test inputs generated for the fuzzing target;
wherein the fuzzing engine is further configured to mutate subsequent test inputs generated for the fuzzing target based on the diagnostic information provided by the fuzz monitor agent.

16. The non-transitory computer-readable medium of claim 15, wherein the mutated subsequent test inputs are subsequently used by the fuzzing target to validate the software.

17. The non-transitory computer-readable medium of claim 15, wherein the at least one watchdog includes one or more of a software watchdog timer or a hardware watchdog timer.

18. The non-transitory computer-readable medium of claim 17, wherein the diagnostic information logged by the fuzz monitor agent includes one or more of: an application/service restart, availability of resources, changes to sensor files, CPU usage, memory usage, or hardware failures.

19. The non-transitory computer-readable medium of claim 17, wherein a timeout period of the software watchdog timer is less than a timeout period of the hardware watchdog timer.

20. The non-transitory computer-readable medium of claim 15, wherein the fuzzing target is an embedded device that is contained within another device or a larger overall system.

* * * * *